United States Patent
Johannesson et al.

(10) Patent No.: US 8,306,266 B2
(45) Date of Patent: Nov. 6, 2012

(54) OPTICAL TRIANGULATION

(75) Inventors: Mattias Johannesson, Linköping (SE); Henrik Turbell, Linköping (SE); Björn Benderius, Linköping (SE)

(73) Assignee: Sick IVP AB, Linkoping (SE)

( * ) Notice: Subject to any disclaimer, the term of this patent is extended or adjusted under 35 U.S.C. 154(b) by 222 days.

(21) Appl. No.: 12/779,532

(22) Filed: May 13, 2010

(65) Prior Publication Data
US 2010/0310126 A1 Dec. 9, 2010

Related U.S. Application Data

(63) Continuation of application No. PCT/SE2008/051295, filed on Nov. 12, 2008.

(30) Foreign Application Priority Data

Nov. 15, 2007 (EP) .................................. 07120778

(51) Int. Cl.
*G06K 9/00* (2006.01)
(52) U.S. Cl. ...................................................... 382/103
(58) Field of Classification Search .................. 382/100, 382/103
See application file for complete search history.

(56) References Cited

U.S. PATENT DOCUMENTS

| | | | |
|---|---|---|---|
| 2006/0028657 A1* | 2/2006 | Typpo | 356/623 |
| 2007/0064975 A1* | 3/2007 | Takanohashi et al. | 382/103 |
| 2008/0225059 A1* | 9/2008 | Lowe et al. | 345/626 |

FOREIGN PATENT DOCUMENTS

FR 2713759 6/1995

OTHER PUBLICATIONS

Curless et al.,"Better Optical Triangulation through Spacetime Analysis" Proceedings of IEEE International Conference on Computer Vision, p. 987-994, Jun. 1995.
Pulli et al., "Acquisition and Visualization of Colored 3D Objects" Proc. Int. Conf. on Pattern Recognition, vol. 1, p. 11-15, Aug. 1998.
Davis et al., "Spacetime Stereo: A Unifying Framework for Depth from Triangulation" IEEE Transactions on pattern analysis and machine intelligence, vol. 27, nr. 2, p. 296-302, Feb. 2005.
Pulli et al., "Surface reconstruction and display from range and color data" Graphical Models, vol. 62, No. 3, p. 165-201, May 2000.

* cited by examiner

*Primary Examiner* — Bhavesh Mehta
*Assistant Examiner* — Shefali Goradia
(74) *Attorney, Agent, or Firm* — Gesmer Updegrove LLP (57) ABSTRACT

The present invention relates to a method for determining the extension of a trajectory in a space-time volume of measure images. The space-time volume of measure images is generated by a measuring method utilizing a measuring system comprising a first light source and a sensor. The measuring method comprises a step of, in a predetermined operating condition of the measuring system, moving a measure object along a first direction of movement in relation to the measuring system while the first light source illuminates the measure object whereby the sensor generates a measure image of the measure object at each time instant in a set of at least two subsequent time instants, thus generating said space-time volume of measure images wherein a feature point of the measure object maps to a trajectory in the space-time volume.

19 Claims, 8 Drawing Sheets

OPTICAL TRIANGULATION

PRIORITY INFORMATION

The present application is a continuation of International application Serial No. PCT/SE2008/51295 filed Nov. 12, 2008, which claims priority to European Application No. 07120778.7, filed on Nov. 15, 2007. Both applications are incorporated herein by reference in their entireties.

TECHNICAL FIELD

The present invention relates to a method for determining the extension of a trajectory in a space-time volume of measure images. The space-time volume of measure images is generated by a measuring method utilizing a measuring system comprising a first light source and a sensor. The measuring method comprises a step of, in a predetermined operating condition of the measuring system, moving a measure object along a first direction of movement in relation to the measuring system while the first light source illuminates the measure object whereby the sensor generates a measure image of the measure object at each time instant in a set of at least two subsequent time instants, thus generating the space-time volume of measure images wherein a feature point of the measure object maps to a trajectory in the space-time volume.

The present invention further relates to a method for determining characteristics of a measure object by means of a measuring system comprising a first light source and a sensor.

Additionally, the present invention relates to a computer program product, an electronic control unit and/or a measuring system adapted to execute any one of the methods above.

BACKGROUND OF THE INVENTION

Nowadays, optical methods are widely used for measuring or determining characteristics of objects, and in particular for measuring the three-dimensional contours of objects. One preferred optical method is a so-called optical triangulation method wherein the object to be measured is moved in relation to a measuring system which includes a light source and a sensor. Optionally, the object is stationary and the measuring system instead moves in relation to the object. Furthermore, optics are generally located between the sensor and the object for focusing light reflected from the object onto the sensor. The light source, the object and the sensor are located at a distance from one another such that they each form a corner of an imaginary triangle, hence the name optical triangulation. During each time instant in a set of at least two subsequent time instants, the sensor generates an image of the object based on light emanated from the light source and reflected from the object, thus generating a set of images. Each image is generally constituted by a set of pixels arranged in a matrix having rows and columns wherein each column generally corresponds to a direction perpendicular to a direction in which the object is moved in relation to the measuring system. A three-dimensional image of the object is then created by analyzing the light intensities in the set of images.

Originally, the aforesaid analysis was limited to scanning each one of the generated images for peaks in the light intensities and generating a three-dimensional image of the object based on the positions of the intensity peaks, i.e. in which image as well as in which part of the image each peak occurs. However, it can be shown that the aforesaid analysis gives a correct three-dimensional image of the object only when the object is perfectly planar and has a uniform reflectivity.

Since a method of creating a three-dimensional image of an object which uses the assumption that the object is perfectly planar seems rather contradictory, improvements of the original optical triangulation method have been proposed.

One improved method of interest for the present invention is disclosed in a paper by B. Curless and M. Levoy, namely "Better Optical Triangulation through Spacetime Analysis" in IEEE International Conference on Computer Vision, pages 987-994, Stanford University, June, 1995. The aforesaid paper discloses an optical triangulation method wherein space-time images are generated for each column of a set of images. As previously indicated, each image has a row dimension and a column dimension; hence each column space-time image has a row dimension and a time dimension. It should be noted that if the space-time images for all of the columns were to be assembled, a space-time volume would be obtained having a column dimension, a row dimension and a time dimension.

B. Curless et. al. further teaches that an enhanced three-dimensional image may be obtained by a scanning procedure comprising the steps of rotating each space-time image by a predetermined angle, which angle is generally denoted the space-time angle, before scanning each row in the rotated space-time image for light intensity peaks. The position of the peaks, in both the row and time dimension, is then rotated back to the original coordinates. Optionally, the scanning procedure above may be described as analyzing the light intensity along trajectories in each space-time image, which trajectories typically are assumed to be straight lines inclined by the space-time angle.

According to B. Curless et. al., the scanning procedure disclosed hereinabove provides for a three-dimensional image generating method which is more robust than the original method. For instance, the scanning procedure is less sensitive to variations in reflection properties of the object. Furthermore, sharp corners and/or end points of an object may be more correctly imaged when using an optical triangulation method including the aforementioned scanning procedure than when using the original method.

B. Curless et. al. further teaches that the predetermined angle by which the space-time image should be rotated can be calculated analytically based on a formula having inter alia the geometrical and optical relation between the sensor and the object as well as the motion of the object as input.

However, when deriving the aforementioned formula for the space-time angle, some assumptions are required e.g. that the sensor is orthographic and that the object moves with a constant velocity in relation to the measuring system during the execution of the optical triangulation method.

Furthermore, the analytically derived space-time angle does not account for secondary effects, such as secondary reflections and/or imperfections of the optics generally connected to the sensor.

As may be realized from the above, there is a need for improving the method of obtaining light intensity trajectories in a space-time image or, more generally, in a space-time volume, which method is not based on the limiting assumptions in B. Curless et. al. and/or which method is adapted to account for secondary effects and/or which method enables that an optical triangulation method, utilizing the obtained trajectories, may use a varying, i.e. not constant, velocity of the object in relation to the measuring system.

SUMMARY OF THE INVENTION

A first objective of the invention is to provide a method for determining the extension of a trajectory in a space-time volume of images, wherein certain secondary effects are accounted for.

A second objective of the invention is to provide a method for determining the extension of a trajectory in a space-time volume of images, which does not require that the sensor is orthographic.

A third objective of the invention is to provide a method for determining the extension of a trajectory in a space-time volume of images, which does not require that an optical triangulation method, utilizing the trajectory extension, moves an object and/or a measure system at a constant, or even known, velocity when generating a space-time volume of images of the object.

At least one of the aforementioned objectives is achieved by a method for determining the extension of a trajectory in a space-time volume of measure images according to claim 1.

Thus, the invention relates to a method for determining the extension of a trajectory in a space-time volume of measure images. The space-time volume of measure images is generated by a measuring method utilizing a measuring system comprising a first light source and a sensor. The measuring method comprises a step of, in a predetermined operating condition of the measuring system, moving a measure object along a first direction of movement in relation to the measuring system while the first light source illuminates the measure object whereby the sensor generates a measure image of the measure object at each time instant in a set of at least two subsequent time instants, thus generating the space-time volume of measure images wherein a feature point of the measure object maps to a trajectory in the space-time volume.

According to the invention, in the predetermined operating condition of the measuring system, the method for determining the extension comprises the steps of:

moving a reference object along the first direction of movement in relation to the measuring system while illuminating the reference object with incident light whereby the sensor generates a reference image of the reference object at each time instant in a set of at least two subsequent time instants, and determining the extension based on the reference images.

Thus, what the present invention proposes is that the extension of a trajectory in a space-time volume of measure images may be established by a determination method, or calibration method, which is similar to the measuring method for generating the measure images of the measure object.

As such, rather than deriving a new formula for the space-time angle of the trajectory, the extension of the trajectory is determined based on data recorded by the measuring system. This approach allows for a great flexibility in the determination method, i.e. the extension of the trajectory may be determined based on one or several criteria specified by a user. Furthermore, the determination method according to the above is capable of, at least implicitly, accounting for secondary effects.

According to an embodiment of the determination method of the invention, the trajectory is constituted by a set of sub-trajectories, each sub-trajectory ranging within a limited sub-volume of the space-time volume. Furthermore, the reference object is assumed to have an object transversal dimension which is substantially perpendicular to the first direction of movement and the reference object is further assumed to further have an object vertical dimension which is substantially perpendicular to the first direction of movement and the object transversal dimension. The method comprises the steps of:

a) defining a set of regions of the reference object, each region having a centre point, wherein the centre point of each region in the set is located at a distance in the object transversal dimension and/or the object vertical dimension from the centre points of the other regions in the set;

b) for each region in the set of regions, determining the extension of a corresponding sub-trajectory, and c) assembling the sub-trajectories to form the trajectory.

According to a further embodiment of the determination method of the invention, the sensor has a sensor longitudinal and a sensor transversal dimension, the sensor transversal dimension being substantially perpendicular to the first direction of movement. Furthermore, a measure image generated by the sensor has an image longitudinal dimension and an image transversal dimension corresponding to the sensor longitudinal dimension and the sensor transversal dimension, respectively, such that the space-time volume has three dimensions: the sensor longitudinal dimension; the sensor transversal dimension and a time dimension. The extension of the trajectory, or the sub-trajectory, is assumed to be a straight line and the extension of the line is defined by an inclination with respect to a first axis of rotation at a first angle and with respect to a second axis of rotation at a second angle, wherein the first axis of rotation is parallel to the image transversal dimension and the second axis of rotation is parallel to the image longitudinal dimension.

The assumption that the trajectory extends along a straight line simplifies the determination of the trajectory extension since the determination method is then reduced to determining the first and second angles. Trajectories in a space-time volume may in many cases be approximated by straight lines without impairing the quality of the end result, hence the embodiment above provides for an efficient yet appropriate method of determining extensions of trajectories. Furthermore, approximating each sub-trajectory of a trajectory by a straight line may provide for an efficient method of approximating the extension of the trajectory in different parts of the space-time volume.

According to another embodiment of the determination method of the invention, the second angle is assumed to be zero. This assumption further simplifies the determination of the trajectory extension as the determination method may be limited to finding a trajectory in a set of space-time images rather than in the full space-time volume.

According to a further embodiment of the determination method of the invention, the reference object is the same as the measure object.

According to another embodiment of the determination method of the invention, the reference images form a space-time volume of reference images identical to the space-time volume of measure images. As such, rather than performing the trajectory extension determination in a separate step prior to the measurement, the determination may be performed based on the measure space-time images. This embodiment provides for a plurality of advantages. For instance, merging the determination method and the measure method to one single method reduces the time required to obtain a complete measure. Furthermore, two subsequent measurements utilizing different operating conditions of a measuring system may be carried out without having to perform an intermediate calibration or determination step between the measurements.

According to a further embodiment of the determination method of the invention, the reference object comprises a first and a second portion, the first and second portion having different reflectance properties.

According to another embodiment of the determination method of the invention, the method comprises a step of determining a measure of the amount of artefacts in a three-dimensional image of the reference object generated from the reference images, the method further comprising the steps of:

a) assuming an extension of the trajectory, and
b) determining the measure of the amount of artefacts when using the assumed extension, wherein steps a) and b) are repeated until the measure is below a predetermined threshold value or has reached a minimum.

Thus, the determination method above preferably reduces the amount of artefacts without necessarily requiring information regarding the origin of the artefacts. As such, the artefacts may be derived from a plurality of phenomena, which includes, but are not limited to: reflection variations of the object; geometry variations of the object; secondary reflections, or imperfections of the optics. The artefacts may even be derived from a combination of a plurality of the phenomena hereinabove. However, regardless of the origin of the artefacts, the method above determines the extension the trajectory for which the artefacts are reduced, preferably minimized. Naturally, this eventually provides for a flexible method of obtaining appropriate measure data, in particularly appropriate three-dimensional images of objects.

According to a further embodiment of the determination method of the invention, the measure of the amount of artefacts is determined by calculating a variance of calculated height profile values in the three-dimensional image of the reference object.

According to another embodiment of the determination method of the invention, the method comprises a step of forming a reference space-time volume of the reference images, the method further comprising the steps of:
a) assuming an extension of the trajectory;
b) analyzing a light intensity distribution along the extension of the assumed trajectory in the reference space-time volume and estimating a centre and a symmetry ratio of the distribution, wherein a distribution having a low symmetry ratio is more symmetrical about the centre than a distribution having a higher symmetry ratio, wherein steps a) and b) are repeated until the symmetry ratio is below a predetermined threshold value or has reached a minimum.

In as similar manner as for the artifact reduction embodiment previously disclosed, determination method above may determine extensions of characteristics without necessarily requiring a priori information regarding the operation condition of the measuring system or any possible artifact generating phenomena of the object and/or measuring system.

According to a further embodiment of the determination method of the invention, the step of estimating a symmetry ratio of the distribution comprises a step of comparing the light intensity value in two trajectory points, the trajectory points being located at a predetermined distance from each side of the centre of the light intensity distribution along the assumed trajectory, and the symmetry ratio is determined based on the difference between the light intensities in the two trajectory points.

According to another embodiment of the determination method of the invention, the incident light has a region with substantially homogenous light, the method further comprising a step of measuring an apparent movement of at least one feature point in the reference images, wherein the extension of the trajectory is estimated by tracking the feature point through the reference images.

Thus, using a motion estimation procedure, a direct method of trajectory extension determination is obtained. The method presented above also has the advantage that different trajectories may easily be determined for different areas of the measure images. Furthermore, the method above may preferably be used for determining trajectories which are not linear. Instead the method may determine an arbitrary extension of the trajectory, for instance a curved extension. Needless to say, this provides for further improvement of the quality of the eventually generated measure data.

According to a further embodiment of the determination method of the invention, the reference object comprises a portion with large contrast variations in the visual field of the sensor.

According to another embodiment of the determination method of the invention, the portion comprises a specular structure, in order to facilitate the measuring of the apparent movement.

According to a further embodiment of the determination method of the invention, the motion estimation is performed utilizing quadrature filters.

A second aspect of the invention relates to a method for determining characteristics of a measure object by means of a measuring system comprising a first light source and a sensor. The method comprises a step of moving the measure object along a first direction of movement in relation to the measuring system while the first light source illuminates the object, whereby the sensor generates a measure image of the object at each time instant in a set of at least two subsequent time instants, thus generating said space-time volume of measure images. The method further comprises a step of identifying a feature point of the measure object by determining a position of peak in the intensity of the reflected light along a trajectory in the space-time volume, wherein the extension of the trajectory is determined using any one of the determination methods above.

According to an embodiment of the second aspect of the invention, the step of determining the position of the peak in the intensity of the light emanated from the object is executed by estimating a light intensity distribution along the trajectory, wherein the peak is determined by estimating the centre of gravity of the light intensity distribution.

According to another embodiment of the second aspect of the invention, the method of determining the extension of the trajectory as well as the method of determining characteristics of the measure object are performed utilizing results from the same run of the measuring system.

According to a further embodiment of the second aspect of the invention, the characteristics to be determined by the method comprise the three-dimensional contour of the measure object.

A third aspect of the invention relates to a computer program product, comprising a computer program containing computer program code executable in a computer or a processor to implement the steps of any of the methods above, the product being stored on a computer-readable medium or a carrier wave.

A fourth aspect of the invention relates to an electronic control unit, comprising a computer program product according to the above and arranged to execute a trajectory extension determination method according to the above and/or a characteristics determination method according to the above.

A fifth aspect of the invention relates to a measuring system comprising a first light source, a sensor, and an electronic control unit according to the above.

According to an embodiment of the fifth aspect of the invention, the measuring system further comprises a second light source and the first light source is adapted to generate a region with substantially homogenous light.

According to another embodiment of the fifth aspect of the invention, the sensor is adapted to generate two sub images simultaneously, wherein one sub image is adapted to be used in the method of determining characteristics of the measure object according to the above and wherein the second sub image is adapted to be used in the method of determining the extension of a trajectory according to the above.

BRIEF DESCRIPTION OF THE DRAWINGS

The present invention will hereinafter be further explained by means of non-limiting examples with reference to the appended figures wherein.

DETAILED DESCRIPTION OF PREFERRED EMBODIMENTS

The invention will, in the following, be exemplified by embodiments. It should however be realized that the embodiments are included in order to explain principles of the invention and not to limit the scope of the invention, defined by the appended claims.

Figure 1:
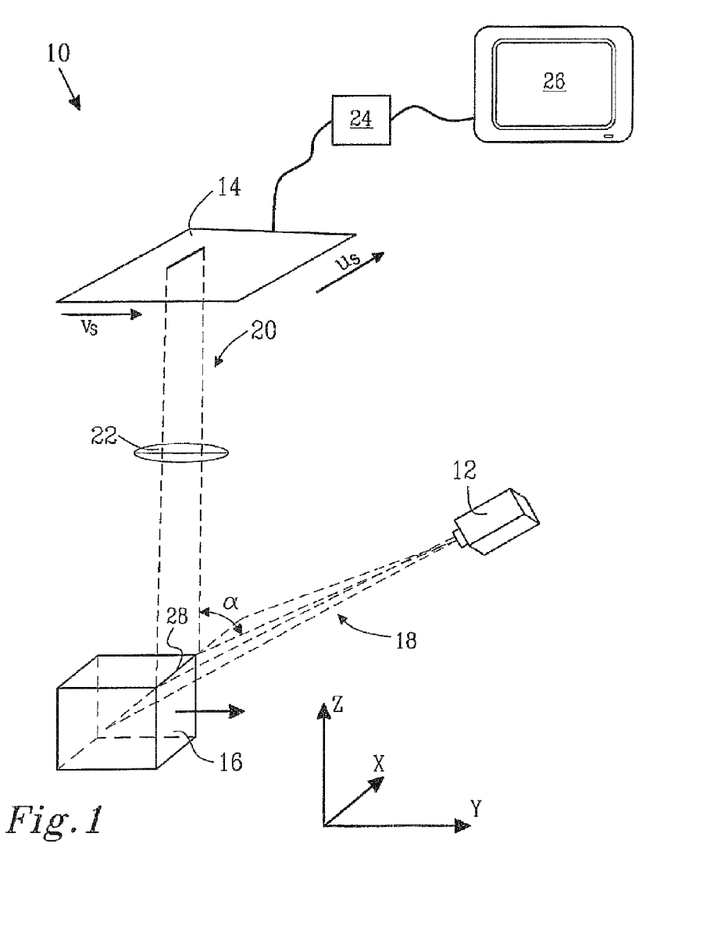
FIG. 1 is a schematic perspective view of a measure system adapted to perform an optical triangulation method.

FIG. 1 illustrates a measuring system 10 adapted to perform an optical triangulation method. The system 10 comprises a first light source 12 and a sensor 14. The first light source 12 is adapted to illuminate a measure object 16 with incident light 18. The sensor 14 is adapted to detect reflected light 20 from the measure object 16 and generate images based on the reflected light 20. Furthermore, the system 10 preferably comprises optics 22, adapted to be located between the sensor 14 and the measure object 16. The optics 22 are in FIG. 1 schematically illustrated as one single lens. However, other optics arrangements are of course feasible. Furthermore, the measuring system is preferably provided with an electronic control unit 24 adapted to store and/or analyze images recorded by the sensor 14. Preferably, the system also comprises viewing means 26, e.g. a display device, adapted to display the recorded images and/or images generated by the electronic control unit 24. Further illustrated in FIG. 1 is a global coordinate system having an X, Y and Z dimension, respectively.

As may be gleaned from FIG. 1, the incident light 18 and the reflected image light 20 form an angle α. This angle α is generally referred to as the triangulation angle.

The first light source 12 is preferably adapted to generate structured light, for example linear light or light composed of multiple, substantially point or linear segments and may be of any type suitable for the application, for example a laser, a light-emitting diode (LED), ordinary light (light bulb) etc, which are familiar to the person skilled in the art and will not be described further herein.

During operation, the measure object 16 moves along a first direction of movement, being the Y-direction in FIG. 1, in relation to the measuring system 10. To this end, the measure object 16 may e.g. be placed on a conveyor belt (not shown) or any similar arrangement. Optionally, the measure object 16 may be stationary and the measuring system 10 is instead adapted to move in relation to the measure object 16. Naturally, combinations of the two alternatives above are of course also possible.

During the relative movement of the measure object 16 with respect to the system 10, the first light source 12 illuminates the measure object 16 whereby the sensor 14 generates a measure image of the measure object 16 at each time instant $t_i$ in a set T of at least two subsequent time instants.

The sensor 14 is preferably a CMOS sensor, but a person skilled in the art will appreciate that the invention may be applied to other types of sensors, such as CCD sensors or any other sensor suitable for generating images of an object, based on the light reflected from the same. As may be gleaned from FIG. 1, the sensor preferably has a sensor longitudinal dimension $v_s$ and a sensor transversal dimension $u_s$. The sensor transversal dimension $u_s$ is preferably substantially perpendicular to the first direction of movement Y.

Variants of the measuring system 10 may of course comprise additional sensors (not shown) and/or additional light sources (not shown). Purely by way of example, these additional sensors and/or light sources may be used for reducing the problem of occlusion.

A measure image generated by the sensor has preferably an image longitudinal dimension $v_i$ and an image transversal dimension $u_i$ corresponding to the sensor longitudinal dimension $v_s$ and the sensor transversal dimension $u_s$, respectively. In practice, the sensor 14 generally comprises a matrix with nxm pixels, where n corresponds to pixels in the sensor longitudinal dimension $v_s$, i.e. rows, and m corresponds to pixels in the sensor transversal dimension $u_s$, i.e. columns.

Each measure object 16 may be regarded as having a three-dimensional contour built up by a plurality of feature points. In FIG. 1 only one feature point 28 is indicated but each side of the measure object 16 in FIG. 1 is constituted by a plurality, theoretically actually an infinity, of feature points. Thus, if information of the three-dimensional position of each feature point 28 is determined, i.e. the (X,Y,Z) coordinates of the feature points, a three-dimensional image of the measure object 16 may be generated by simply assembling the geometrical information for the entire set of feature points. It should be noted that it may also be possible to determine other characteristics of each feature point besides the mere location of the point. Such characteristics may include, but are not limited to, reflectance and/or light scattering properties.

Figure 2A:
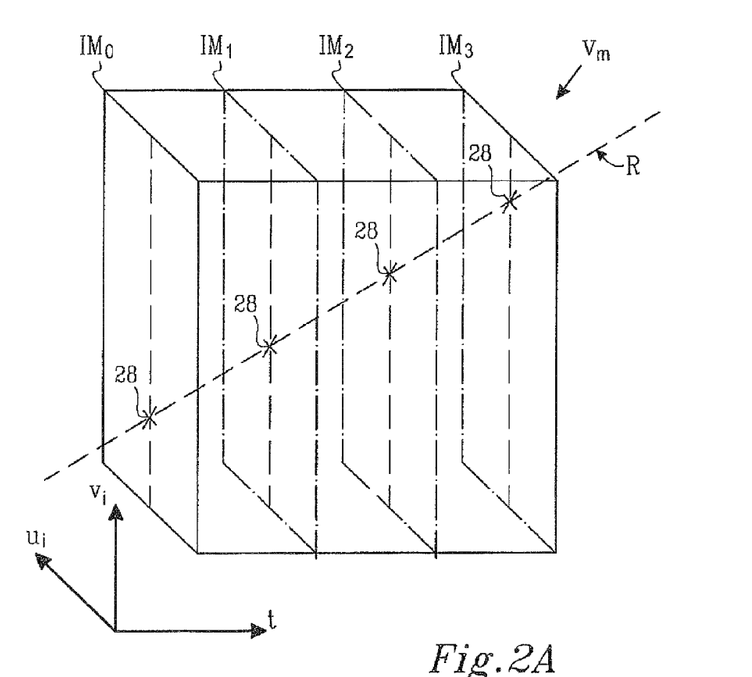
FIGS. 2A-2C is a schematic view of results obtained from an optical triangulation method utilizing the measure system of FIG. 1.
Figure 2B:
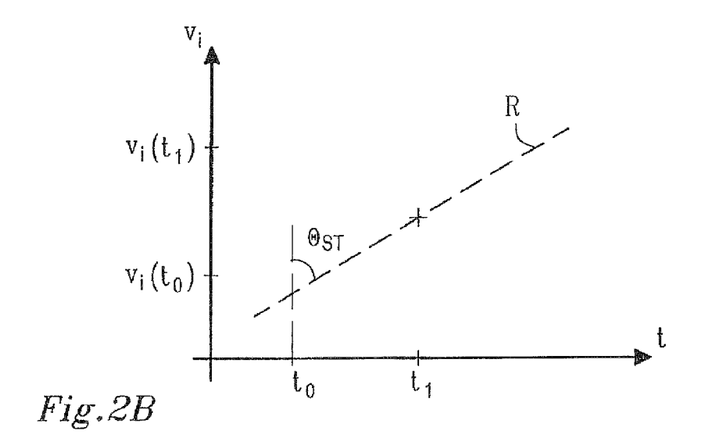
Figure 2C:
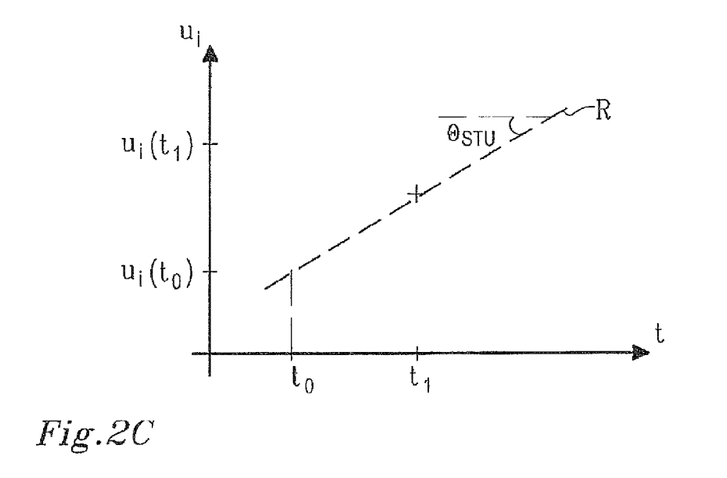

FIGS. 2A-2C illustrate a set of measure images generated by the measuring system 10 illustrated in FIG. 1 at each time instant $t_i$ in a set T of at least two subsequent time instants. As may be gleaned the set of images is in FIG. 2 constituted by four images $IM_0$-$IM_3$ corresponding to four time instants $t_0$-$t_3$. FIG. 2 further illustrates that the images $IM_0$-$IM_3$ have been stacked onto each other, thus forming a space-time volume $V_m$ of measure images. Each one of the images $IM_0$-$IM_3$ in FIG. 2 has an image transversal dimension $u_i$ and an image longitudinal dimension $v_i$, hence the space-time volume $V_m$ illustrated in FIG. 2 has three dimensions, the time dimension being the third dimension.

Since the measure object 16 moves in relation to the measure system 10 during the generation of the measure images $IM_0$-$IM_3$, a feature point 28 of the measure object 16 will map to a trajectory R in the space-time volume $V_m$.

As such, at each one of the time instants $t_0$-$t_3$ wherein the feature point 28 is in the field of view of the sensor 14, the reflected light 20 from the feature point 28 will hit a point on the sensor 14. The location of the point where the reflected light 20 hits the sensor, as well as the magnitude of the intensity of the reflected light 20, is dependent on e.g. the relative distance between the measure object 16, the sensor 14 and the first light source 12. Thus, once the maximum light intensity, i.e. the peak of the light intensity, has been identified along the trajectory R, the coordinates of the peak in the ($u_i,v_i,t$) coordinate system will reveal information regarding inter alia the location of the feature point 28 in the (X,Y,Z) coordinate system.

Generally speaking, the time value of the peak will provide information regarding the Y-coordinate, the $u_i$-value will provide information regarding the X-coordinate and the $v_i$-value will provide information regarding the Z-coordinate of the feature point 28.

As may be realized from FIG. 2, the extension of the trajectory R is dependent on the velocity with which the measure object 16 moves in relation to the measure system 10. As such, if the aforesaid velocity is zero, i.e. if the measure object 16 was to be stationary in relation to the measure system 10, the extension of the trajectory R would be parallel to the time axis. On the other hand, should the measure object 16 move with an infinitely high speed in relation to the measure system 10, the extension of the trajectory R would be in the $u_i$-$v_i$-plane only.

The extension of the trajectory R may be approximated in a plurality of ways. One straightforward way is to approximate the trajectory R by a straight line, the extension of which is defined by an inclination with respect to a first axis of rotation at a first angle and with respect to a second axis of rotation at a second angle. This is illustrated in FIG. 2B and FIG. 2C, respectively, wherein FIG. 2B illustrates that the first angle $\theta_{ST}$ is herein defined as a rotation about a first axis of rotation which is parallel to the image transversal dimension $u_i$ and wherein FIG. 2C illustrates that the second angle $\theta_{STU}$ is herein defined as a rotation about a second axis of rotation which is parallel to the image longitudinal dimension $v_i$. When studying the various embodiments of the trajectory extension determination method according to the invention, it should be borne in mind that the straight line approximation of the trajectory R is appropriate for all of the embodiments. However, it should also be noted that each one of the embodiments is also well suited to be used with other trajectory extension approximations, such as e.g. a parabolic extension.

Figure 3:
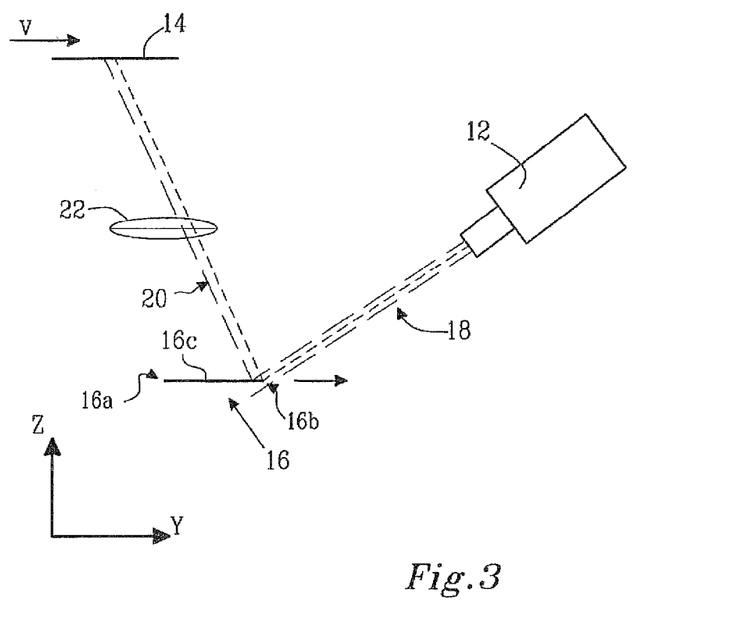
FIG. 3 is a two-dimensional schematic view of the measure system of FIG. 1 when measuring a narrow measure object.

Now turning to FIG. 3, in order to simplify an explanation of the benefits in using space-time analysis, a two-dimensional version of the measuring system 10 is presented when measuring a narrow measure object 16, which in FIG. 3 is a measure object 16, idealized to the form of a line having an extension in one direction only. In FIG. 3, the measure object 16 extends in the Y-direction. The measuring system 10 operates as previously presented wherein the sensor 14 generates a measure image of the measure object 16 at each time instant $t_i$ in a set T of at least two subsequent time instants. Generally, measure images would form a space-time volume $V_m$ of measure images, but since the measuring system 10 in FIG. 3 has been reduced to a two-dimensional system, each measure image is here a one-dimensional image; hence the measure images in this case form a space-time image $I_m$, which is illustrated in FIG. 4A.

In order to obtain a space-time image $I_m$ which is oriented in the same manner as the measure object 16, the space-time image $I_m$ may be generated by arranging the set of measure images $IM_i$ in a reversed time order. Arranging the set of measure images $IM_i$ in such a manner will ensure that the rightmost portion 16b of the measure object 16 will map to the rightmost portion 16B of the imaged object as illustrated in FIGS. 3 and 4A.

Figure 4A:
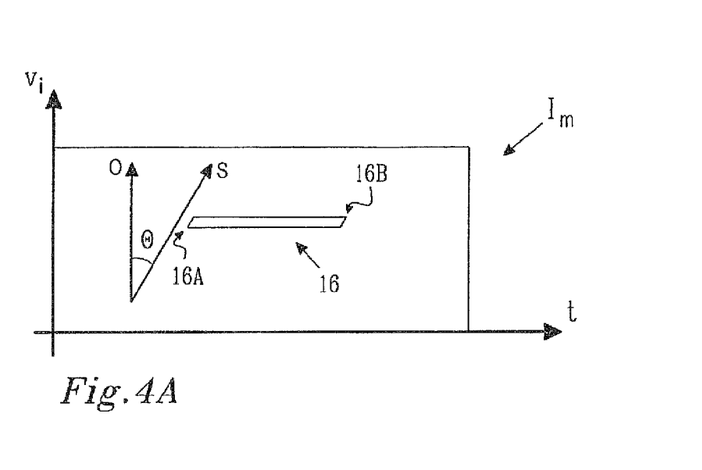
FIG. 4A-4D is two-dimensional results from the measuring illustrated in FIG. 3.

FIG. 4A further illustrates two trajectories O and S, respectively, along which trajectories peaks of light intensity are searched for. As may be realized from FIG. 4A, the first trajectory O corresponds to the original analysis of measure images obtained from an optical triangulation method, wherein each row in the space-time image $I_m$ is searched for light intensity peaks. The second trajectory S corresponds to a space-time analysis of the measure images.

Figure 4B:
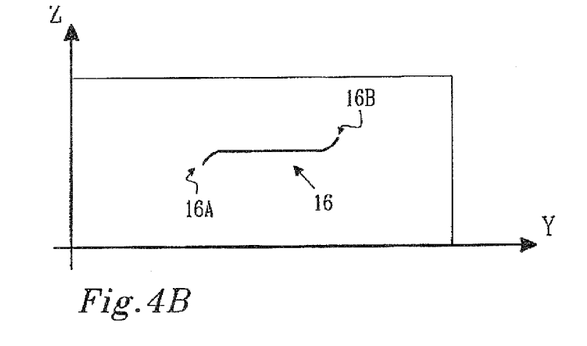
Figure 4C:
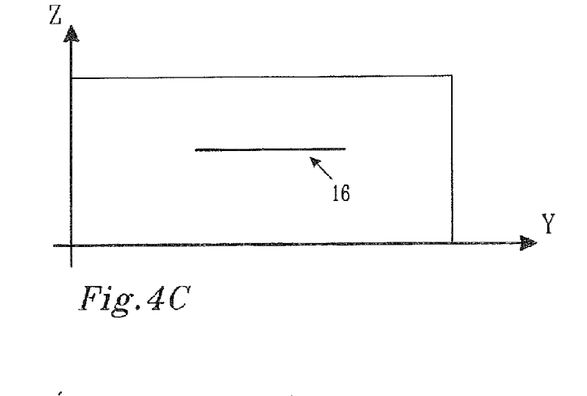

FIG. 4B illustrates the resulting image, i.e. the image of the measure object 16 in the Y,Z-coordinates, when utilizing the first trajectory O. As may be gleaned from FIG. 4B, the resulting image presents incorrect representations of the first and second end portions 16A and 16B of the measure object 16. The reason for this incorrect representation could generally be derived from the fact that the incident light 18 generated by the first light source 12 is a light beam having an extension in the Y-direction which is greater than zero, i.e. the incident light 18 will never hit one single point of the measure object 16 but rather a range thereof, be it that this range may be narrow. Naturally, since the incident light 18 has an extension in the Y-direction, the reflected light 20 will consequently also have an extension in the Y-direction. The extension of the incident light 18 and the reflected light 20, respectively, is indicated by dashed and dotted lines in FIG. 3. As such, when the incident light 18 is close to e.g. the first end portion 16A of the measure object, only a portion of the incident light 18 will hit the measure object 16 while the remaining portion of the light 18 will simply pass the same. Different light sources may produce light beams with different light intensity distributions. Purely by way of example, a light source may for instance produce a light beam having a normal (Gaussian) light intensity distribution.

The reflected light 20 from the first end portion 16A will consequently only be a fraction of the reflected light 20 from e.g. the centre portion 16C of the measure object 16. The aforesaid fraction of the reflected light will thus generate a light intensity distribution with a peak having an image longitudinal coordinate $v_i$ which does not correspond to the actual Z-coordinate of the first end portion 16A. This effect is not accounted for when searching the space-time image $I_m$, along the trajectory O for peaks in the light intensity; hence the corresponding Z-coordinate of the resulting image of the first end portion 16A, and consequently the second end portion 16B, will differ from the correct one.

If instead the second trajectory S is used when searching the space-time image $I_m$ for peaks in the light intensity, the gradual reduction in incident light 18 hitting the measure object 16, and consequently the gradual reduction in reflected light 20, when approaching the first end portion 16A is captured. Thus, a peak in light intensity distribution along the second trajectory S will correspond to the correct Z-coordinate of the end portion 16A.

Figure 4D:
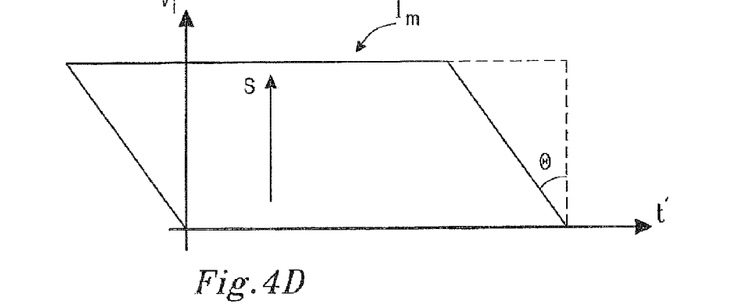

In practice, rather that searching for peaks in light intensities along the trajectory S, the space-time image $I_m$ is transformed from the $v_i$, t coordinate system to a $v_i'$, t' coordinate system such that the second trajectory S extends along the $v_i'$-dimension, see FIG. 4D. The transformed space-time image $I_m$ is then searched for peaks in light intensities along the $v_i'$-dimension and the peaks thus found are transformed back to the $v_i$, t coordinate system before the final image in the Y,Z coordinates is generated.

If the second trajectory S is assumed to be a straight line which is tilted by an angle $\theta$ with respect to the $v_i$ dimension, the space-time image $I_m$ may be rotated by the angle $-\theta$ in order to obtain a transformed space-time image $I_m'$, as illustrated in FIG. 4D. However, the inventors of the present invention have realised that the space-time image $I_m$ may instead simply be sheared by the angle $-\theta$ while still obtaining sufficiently accurate results.

As may be realized when studying FIG. 4A-4D, determining the extension of the trajectory R is of great importance in order to obtain a sufficiently accurate reproduction of the measure object 16. However, as previously indicated, prior art only teaches that the trajectory R may be approximated by a straight line tilted by an angle θ with respect to the $v_i$ dimension of the space-time image wherein the angle θ, generally denoted the space-time angle, may be derived from an analytical expression.

What the present invention proposes is instead that the trajectory may be established by a trajectory extension determination method which uses measure data obtained from the measure system 10. The measure system 10 may be used for executing a determination method, or a calibration method, of the extension of the trajectory in a space-time volume $V_m$ of measure images. Optionally, measure images of a measure object 16 may be post-processed in order to establish which trajectory yields the best end result.

Various embodiments of the determination method above will be presented hereinbelow. However, what all the embodiments have in common, is that they are intended to be used for the same operating condition as for which the space-time volume $V_m$ of measure images is generated. Moreover, the invention proposes that a reference object 30, which however in some cases may be the same as the measure object 16, is measured by the measuring system 10 such that a set of reference images $IR_0$-$IR_n$ is generated. The extension of the trajectory is then determined based on the reference images $IR_0$-$IR_n$.

In the embodiments below, the determination of the extension of one single trajectory R is presented. However, any one of the embodiments may of course be used for determining the extensions of a plurality of trajectories R in the space-time volume of measure images $V_m$. For instance, a set of sub-trajectories may be determined for a space-time volume of measure images $V_m$ wherein each sub-trajectory corresponds to a certain feature point 28 or a feature area of a measure object 16. Each sub-trajectory is valid for a limited interval along at least one of the $u_i$ or $v_i$ dimensions and a trajectory R for the total space-time volume $V_m$ may be generated by assembling those sub-trajectories.

The sub-trajectories in the space-time volume of measure images $V_m$ may also be regarded as a vector field in the aforesaid space-time volume $V_m$. If a measure object 16 moves with a constant velocity in relation to the measuring system 10, the sub-trajectories may be regarded as a vector field in the $u_i,v_i$-plane only, i.e. the extension of a sub-trajectory corresponding to a specific $u_i,v_i$-coordinate will not change along the time dimension t.

As such, if a measure object 16 moves with a constant relative velocity, the extension of a sub-trajectory corresponding to a certain $u_i,v_i$-coordinate, or even to a certain range in both the $u_i$ and $v_i$ dimension, may be represented by local values of the first and second angles $θ_{ST}, θ_{STU}$, which angles have been discussed in conjunction with FIG. 2B and FIG. 2C. If the aforementioned local values are determined for one single $u_i,v_i$-coordinate and this coordinate is assumed to be representative for the entire measure object 16, a vector field is obtained which is constant, i.e. independent of the actual $u_i,v_i$-coordinate. This approach corresponds to the constant extension of the second trajectory S in FIG. 4A, i.e. the second trajectory S has the same inclination θ irrespective of the value along the $v_i$ dimension. In other words, the second trajectory S in FIG. 4A may be regarded as being constituted by one single sub-trajectory.

However, the aforementioned local values may also be determined for a plurality of points being located at a distance in the X and/or Z dimension from one another, thus corresponding to different points in the $u_i$ and/or $v_i$ dimension. Each one of these local values may then be assumed to be valid in an interval ranging in the $u_i$ and/or $v_i$ dimension. Thus, again referring to the two-dimensional example illustrated in FIG. 4A, the time-space image $I_m$ illustrated therein may be split up into a plurality of horizontally extending strips (not shown). Then, a local space-time angle θ may be determined for each one of the strips. Purely, by way of example, the $v_i$-coordinate of the centre along a strip may be used when determining the local space-time angle θ utilizing the determination method of the invention, and this local space-time angle θ is then assumed to apply throughout the strip. As such, a trajectory R of the time-space image $I_m$ may in this case be regarded as being built up by a subsequent set of linear portions, or sub-trajectories, one portion for each strip, thus forming a piecewise linear trajectory R along the $v_i$ dimension.

Figures 5A, 5B:
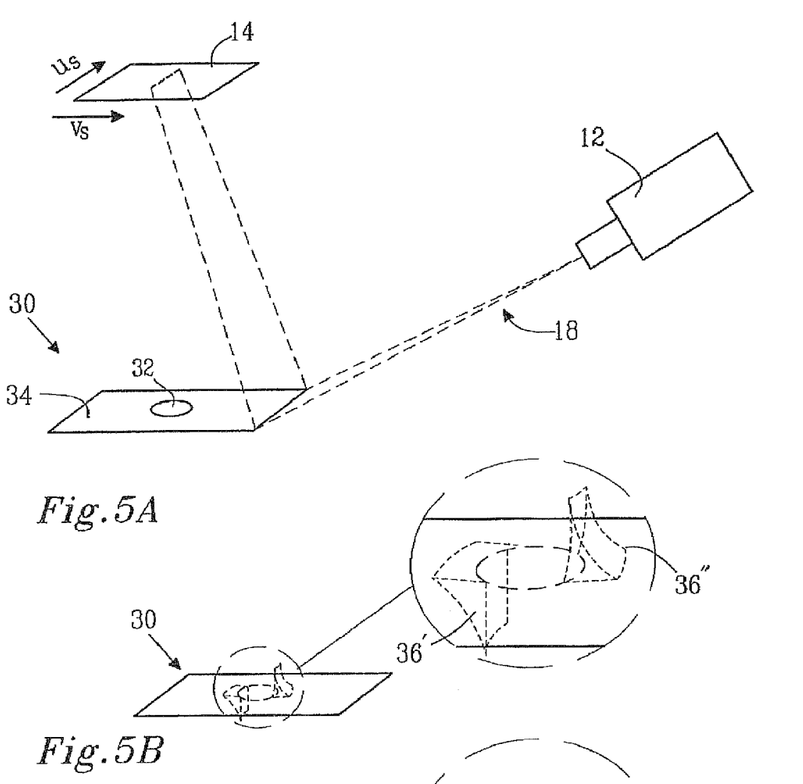
FIG. 5A-5C illustrates an extension determination method according to a first embodiment of the invention.
Figure 5C:
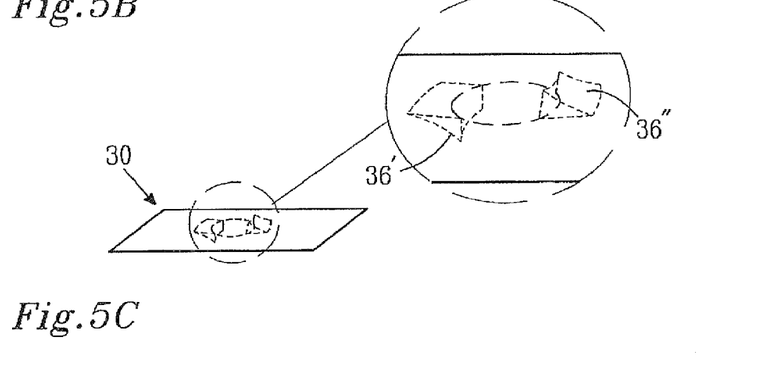

FIGS. 5A-5C illustrate a first embodiment of the determination method of the invention. As may be gleaned from FIG. 5A, the reference object 30 comprises a first portion 32 and a second portion 34, the first and second portions 32, 34 having different reflectance properties. As used herein the expression "reflectance property" relates to a measure of the fraction of incident radiation reflected by a surface. Generally, the "reflectance property" is dependent on inter alia the direction of the reflected light, the direction of the incident light and the wavelength of the incident light. Obviously, the reference object 30 may comprise a plurality of portions, each portion having a reflectance property which is different from the reflectance properties of adjacent portions (not shown).

In FIG. 5A, the reference object 30 comprises a substantially flat surface in the visual field of the sensor 14 and the surface extends in a direction substantially parallel to the first direction of movement Y. This is a preferred design of the reference object when performing the first embodiment of the determination method of the invention, but other designs of the reference object 30 may also be appropriate. Since the surface of the reference object 30 in FIG. 5A is substantially flat, a three-dimensional image of the reference object 30, utilizing an optical triangulation method for generating a space-time volume of reference images $V_r$, should also be substantially flat.

However, and as may be gleaned from FIG. 5B, due to the different reflectance properties of the first portion 32 and the second portion 34 of the reference object 30, artefacts 36', 36" incorrectly indicating a height difference in the area between the two portions 32, 34 of the reference object 30 may occur in the resulting three-dimensional image. These artefacts will most probably be most evident if the first trajectory O is used for searching a time-space volume of reference images $V_r$ for light intensity peaks. The artefacts 36', 36" would probably decrease, should the second trajectory S be used instead. However, and as has been discussed previously, since the determination of the extension of the second trajectory S does not account for e.g. several optical phenomena, it is far from certain that the use of the second trajectory S will yield a three-dimensional image of the reference object 30 having the lowest and/or smallest amount of artefacts 36', 36".

Thus, according to the first embodiment of the present invention, the determination method comprises the step of
a) assuming an extension of the trajectory R in the time-space volume of reference images $V_r$, and
b) determining the measure of the amount of artefacts when using the assumed extension.

The steps a) and b) are then repeated until the measure is below a predetermined threshold value or has reached a minimum.

FIG. 5C indicates the three-dimensional image of the reference object 30 created when using the extension of the trajectory R obtained from the method above. Compared to the image in FIG. 5B, it is evident that the amount of artefacts 36', 36'' has been reduced significantly, hence an extension of the trajectory R has been obtained which has a sufficiently low sensitivity to variations in reflectance properties. This provides for the three-dimensional image of a measure object 16, measured in the same operation condition as for the method hereinabove, also being sufficiently insensitive to reflectance variations.

As a measure of the amount of artefacts 36', 36'', the variance of calculated height profile values in the three-dimensional image of the reference object 30 is preferably used. As such, the measure may also be considered as being a measure as regards the size of the artefacts 36', 36''. This measure may preferably be used in an optimization routine programmed to minimize the measure by selecting the optimum extension of the trajectory R.

It should be noted that although the example of the first embodiment of the determination method of the present invention presented hereinabove utilizes a substantially flat reference object 30, the first embodiment may also be used in conjunction with a reference object 30 having portions with different heights, i.e. different Z-coordinates (not shown). As such, should a measure object 16 be provided with a first and second portion 32, 34 having different reflectance properties, the measure object 16 itself may be used as the reference object 30. Thus, the extension determination method according to the embodiment described hereinabove may then preferable be used as a post-processing method.

Figure 6:
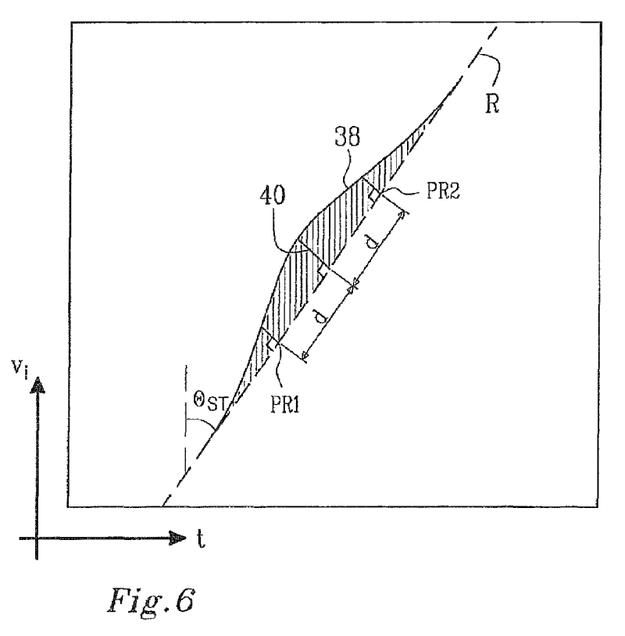
FIG. 6 illustrates an extension determination method according to a second embodiment of the invention.

FIG. 6 illustrates a second embodiment of the determination method of the invention. The second embodiment uses the fact that a feature point 28 will generate a light intensity distribution 38 along a trajectory R in the space-time volume of reference images $V_r$. The trajectory R in FIG. 6 is approximated by a straight line, but an arbitrary extension of the trajectory R may of course be determined utilizing the second embodiment of the determination method.

The FIG. 6 determination method utilizes the insight that when the correct trajectory R extension is obtained, the light intensity distribution 38 is fully symmetrical about the centre 40, generally the centre of gravity, of the light intensity distribution 38. As such, the second embodiment of the determination method of the invention comprises the steps of
a) assuming an extension of the trajectory R, and
b) analyzing a light intensity distribution 38 along the extension of the assumed trajectory R in the reference space-time volume $V_r$, and estimating a centre 40 and a symmetry ratio SR of the distribution.

Steps a) and b) are then repeated until the symmetry ratio SR is below a predetermined threshold value or has reached a minimum.

The second embodiment has several advantages. For instance, there are no specific requirements on the reference object 30, e.g. in terms of reflectance properties or similar. Furthermore, the second embodiment may provide for a straightforward implementation of a post-processing routine for a space-time volume of measure images $V_m$ i.e. the reference object 30 and the measure object 16 are one and the same.

As used hereinabove, a distribution 38 having a low symmetry ratio SR is more symmetrical about the centre 40 than a distribution having a higher symmetry ratio SR. As such, in a similar manner as in the first embodiment of the determination method of the invention, the symmetry measure SR may preferably be used in an optimization routine programmed to minimize the symmetry measure SR by selecting the optimum extension of the trajectory R.

A preferred manner of estimating the symmetry ratio SR comprises a step of comparing the light intensity value in two trajectory points PR1, PR2. The trajectory points PR1, PR2 are located at a predetermined distance d from each side of the centre 40 of the light intensity distribution 38 along the assumed trajectory R. The symmetry ratio SR is then, in a preferred implementation of the second embodiment, determined based on the difference between the light intensities in the two trajectory points PR1, PR2.

Figure 7:
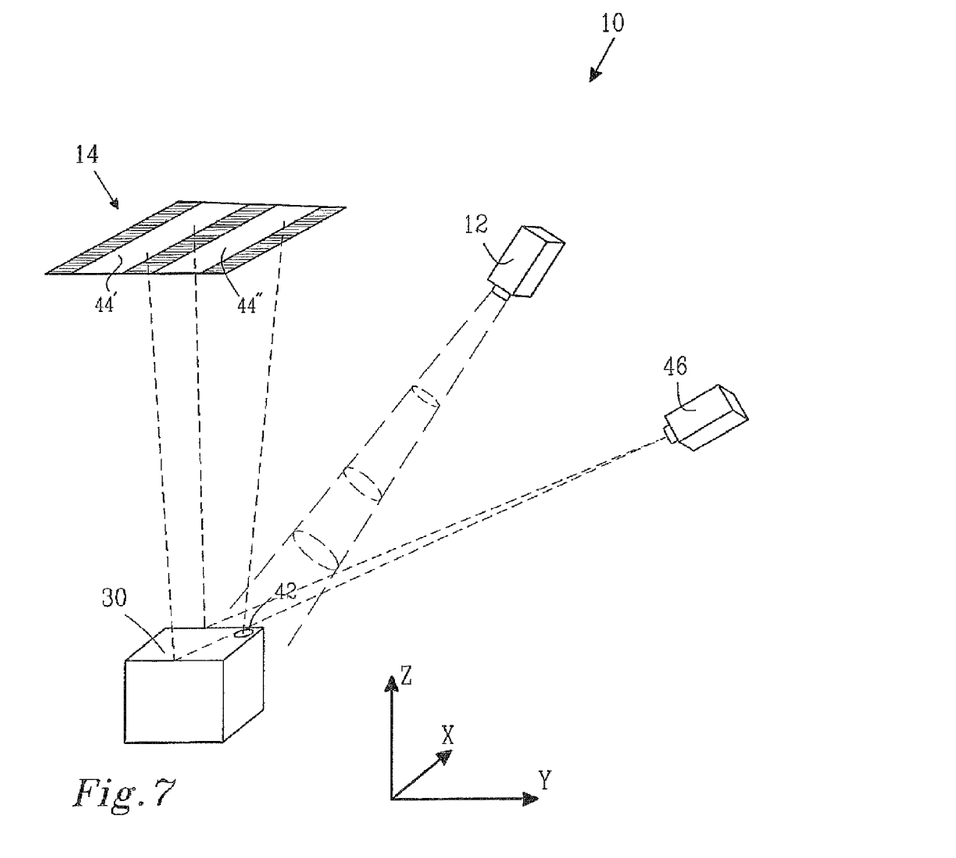
FIG. 7 is a schematic perspective view of a measure system adapted to execute a third embodiment of the extension determination method.

FIG. 7 illustrates a third embodiment of the determination method of the invention. The third embodiment uses the teachings disclosed in connection with FIG. 2A, namely that the extension of the trajectory R is dependent of the motion of the measure object 16 in relation to the measuring system 10. As such, a motion estimation algorithm thoroughly estimating the motion of one or several points of the reference object 30 may be used when determining the extension of the trajectory.

As such, a motion vector at a particular point of the reference object 30 may preferably be estimated utilizing the so-called optical flow equation. A more complete explanation on how this is done in detail is presented in K. Nordberg and F. Vikstén "Motion based estimation and representation of 3D surfaces and boundaries", IWCM04, Günzburg, Germany, International Workshop on Complex Motion (IWCM), October, 2004. It should however be noted that there are other feasible methods for obtaining the motion vector, known to the person skilled in the art.

Utilizing the motion vector thus obtained, an apparent movement of the point of the reference object 30 may be determined. Once the apparent movement of the point is known, the extension of the trajectory R may be determined by letting the trajectory R tail the apparent movement. The extension of the trajectory R thus determined may then be assumed to be valid for every point in the reference images. Optionally, the apparent movement of a plurality of points, which preferably have different X- and/or Z-coordinates, of the reference object 30 are determined. Thus, a plurality of sub-trajectories may be generated the extensions of which are dependent on the X- and Z-coordinates of the corresponding point and consequently the $u_i,v_i$-coordinates in the space-time volume $V_m$. These sub-trajectories may then be assembled to form one trajectory R.

In order to perform the motion estimation algorithm above, the first light source 12 is preferably adapted to generate a region with substantially homogenous light. Moreover, in order to enhance the function of the motion estimation algorithm, the reference object 30 preferably comprises a portion with large contrast variations, more preferably the portion comprises a specular structure.

The reason for using a reference object 30 comprising a portion with large contrast variations in combination with a homogenous light is described below. Without going into details, solving the aforementioned optic-flow equation may be regarded as finding the null vector to an orientation tensor Q. The orientation tensor may in turn be represented by a point descriptor matrix M. From e.g. K. Nordberg et. al. it is known that when determining an apparent movement of an object by analyzing the descriptor matrix M, the descriptor matrix M in fact has rank one if the object contains only one single point. Thus, by introducing the portion 42 with large contrast variations in the reference object 30, the reference object 30 could be regarded as containing only one single point, being the portion 42 with large contrast variations. Since the rank of the descriptor matrix M is reduced to rank one, the analysis of the same is simplified which in turns simplifies the estimation of the apparent movement of the portion 42 with large contrast variations.

The motion vector could also be obtained by reducing the problem to a two-dimensional problem and generating a space-time image of the reference object 30. Information concerning the motion vector could then be obtained by convolving the space-time image with a set of so-called quadrature filters. This approach is discussed in detail in H. Knutsson "Filtering and Reconstruction in Image processing", PhD thesis, Linköping University, Sweden, 1982, Diss. No. 88, as well as in Nordberg, K.; Farnebäck, G "A framework for estimation of orientation and velocity" International Conference on Image Processing, 2003, ICIP 2003, publication date 14-17 Sep. 2003, Volume 3, Page(s): III-57-60 vol. 2.

FIG. 7 further illustrates a preferred measuring system 10 for performing the estimation method according to the third embodiment of the invention. The FIG. 7 measuring system 10 comprises two light sources, the first light source 12 and a second light source 46. The first light source 12 is adapted to generate a region with substantially homogenous light to be used in the apparent movement method as discussed above, whereas a second light source 46 may preferably be adapted to generate light well suited for generating three-dimensional images of objects. Furthermore, the sensor 14 of the measuring system 10 of FIG. 7 may be adapted to generate two sub-images 44', 44" for each one of least two subsequent time instants and may thus be used for generating two sets $SI_1$, $SI_2$ of sub-images. The first set of sub-images $SI_1$ may be used for generating images for determining characteristics of a measure object, in particular the three-dimensional contour of the same. The second set of sub-images $SI_2$ may be used for apparent movement method discussed above.

Once the extension of the trajectory R in a space-time volume of measure images $V_m$ has been determined using any one of the embodiments discussed hereinabove, the extension may of course be used for determining characteristics of a measure object 16, preferably the three-dimensional contour and/or the reflectance distribution and/or the light scattering properties of the same, by analysing light intensities along the trajectory R in the space-time volume $V_m$ generated by a set of measure images $IM_i$. The analysis may be performed in a plurality of ways. For instance, if the trajectory R is assumed to be straight line and the inclination of the trajectory is assumed to be valid for all points in the space-time volume $V_m$, the space-time volume $V_m$ may be either rotated or sheared in correspondence with the inclination of the trajectory R. Optionally, instead of transforming the space-time volume $V_m$, a search procedure may be established in which the trajectory R is followed in the original space-time volume $V_m$. Additionally, if a plurality of trajectories R has been determined in a space-time volume $V_m$, e.g. different trajectories R for different portions of the sensor 14, a search procedure may be generated which firstly interpolates the extension of a trajectory R for each point of the sensor 14 and then follows the extension of the interpolated trajectory R when searching for light intensity peaks.

The characteristics determination method described hereinabove may be used in a wide field of applications. Purely by ways of example, the method may be used for generating three-dimensional images of products in order detect defects thereof. The defects search for may for instance be cracks or scratches unintentionally provided on the products. As a specific example, the product may be wood and the measuring system of the invention may advantageously be used in a sawmill for controlling the quality of sawn timber.

Further modifications of the invention within the scope are feasible. For example, although the concept of generating a trajectory R by assembling a plurality of sub-trajectories only has been discussed in detail in connection with the third embodiment of the present invention, this concept is feasible for all the embodiments of the determination method of the present invention. Purely by way of example, the reference object 30 illustrated in FIG. 5A may be provided with a plurality of surfaces each one having a first and a second portion 32, 34 with different reflectance properties wherein the surfaces preferably are located at a distance in the X- and/or Z-dimension from one another. Then, the determination method discussed in conjunction with FIGS. 5B and 5C may preferably be carried out for each one of the aforesaid surfaces, thus generating a plurality sub-trajectories which may be assembled to a trajectory R. As for the second embodiment, the symmetry ratio SR may preferably be minimized along a plurality of different intervals in the $u_i$ and/or $v_i$ dimension of the space time volume $V_m$, thus generating sub-trajectories for each of the aforesaid intervals. As such, the present invention should not be considered as limited by the embodiments and figures described herein. Rather, the full scope of the invention should be determined by the appended claims, with reference to the description and drawings.

The invention claimed is:

1. A method for determining the extension of a trajectory in a space-time volume of measure images said space-time volume of measure-images being generated by a measuring method utilizing a measuring system comprising a first light source and a sensor, said measuring method comprises a step of, in a predetermined operating condition of said measuring system, moving a measure object along a first direction of movement in relation to said measuring system while said first light source illuminates said measure object whereby said sensor generates a measure image of said measure object at each time instant in a set of at least two subsequent time instants, thus generating said space-time volume of measure images wherein a feature point of said measure object maps to a trajectory in said space-time volume, wherein said method for determining said extension, in said predetermined operating condition of said measuring system, comprises the steps of:

moving a reference object along said first direction of movement in relation to said measuring system while illuminating said reference object with incident light whereby said sensor generates a reference image of said reference object at each time instant in a set of at least two subsequent time instants,     and     determining said extension based on said reference images.

2. The method according to claim 1, wherein said trajectory is constituted by a set of sub-trajectories, each sub-trajectory ranging within a limited sub-volume of said space-time volume, said reference object has an object transversal dimension which is substantially perpendicular to said first direction of movement, said reference object further has an object vertical dimension which is substantially perpendicular to said firs direction of movement and said object transversal dimension, wherein said method comprises the steps of:

a) defining a set of regions of said reference object, each region having a centre point, wherein said centre point of each region in said set is located at a distance in said object transversal dimension and/or said object vertical dimension from the centre points of the other regions in said set;
b) for each region in said set of regions, determining said extension of a corresponding sub-trajectory, and
c) assembling said sub-trajectories to form said trajectory.

3. The method according to claim 1, wherein said sensor has a sensor longitudinal and a sensor transversal dimension, said sensor transversal dimension being substantially perpendicular to said first direction of movement, where in a measure image generated by said sensor has an image longitudinal dimension and an image transversal dimension corresponding to said sensor longitudinal dimension and said sensor transversal dimension, respectively, such that said space-time volume has three dimensions: said image longitudinal dimension; said image transversal dimension and a time dimension, wherein said extension of said trajectory, or said sub-trajectory, is assumed to be a straight line and the extension of said line is defined by an inclination with respect to a first axis of rotation at a first angle and with respect to a second axis of rotation at a second angle, wherein said first axis of rotation is parallel to said image transversal dimension and said second axis of rotation is parallel to said image longitudinal dimension.

4. The method according to claim 3, wherein said second angle is assumed to be zero.

5. The method according to claim 1, wherein said reference object (is the same as said measure object.

6. The method according to claim 5, wherein said reference images form a space-time volume of reference images identical to the space-time volume of measure images.

7. The method according to claim 1, wherein said reference object comprises a first and second portion, said first and second portion having different reflectance properties.

8. The method according to claim 7, wherein the method comprises a step of determining a measure of the amount of artefacts in a three-dimensional image of said referencing object generated from said reference images, said method further comprising steps of:
a) assuming an extension of said trajectory, and
b) determining said measure of the amount of artefacts when using said assumed extension,
wherein steps a) and b) are repeated until said measure is below a predetermined threshold value or has reached a minimum.

9. The method according to claim 8, wherein said measure of the amount of artefacts is determined by calculating a variance of calculated height profile values in said three-dimensional image of said reference object.

10. The method according to claim 1, wherein the method comprises a step of forming a reference space-time volume of said reference images, said method further comprising the steps of:
a) assuming an extension of said trajectory;
b) analyzing a light intensity distribution along the extension of said assumed trajectory in said reference space-time volume and estimating a centre and a symmetry ratio of said distribution, wherein a distribution having a low symmetry ratio is more symmetrical about said centre than a distribution having a higher symmetry ratio, wherein steps a) and b) are repeated until said symmetry ratio is below a predetermined threshold value or has reached a minimum.

11. The method according to claim 10, wherein said step of estimating a symmetry ratio of said distribution comprises a step of comparing the light intensity value in two trajectory points, said trajectory points being located at predetermined distance from each said of said centre of said light intensity distribution along said assumed trajectory, and said symmetry ratio is determined based on the difference between the light intensities in said two trajectory points.

12. The method according to claim 1, wherein said incident light has a region with substantially homogenous light, said method further comprises a step of measuring an apparent movement of at least one point in said reference images, wherein said extension of said trajectory is estimated by tracking said feature point through said reference images.

13. The method according to claim 12, wherein said reference object comprises a portion with large contrast variations in the visual field of said sensor.

14. The method according to claim 13, wherein said portion comprises a specular structure, in order to facilitate said measuring of said apparent movement.

15. The method according to claim 12, wherein said motion estimation is performed utilizing quadrature filters.

16. The method for determining characteristics of a measure object by means of a measuring system comprising a first light source and a sensor, said method comprises a step of moving said measure object along a first direction of movement in relation to said measuring system while said first light source illuminates said object whereby said sensor generates a measure image of said object at each time instant in a set of at least two subsequent time instants, thus generating a space-time volume of measure images, said method further comprising a step of identifying a feature point of said measure object by determining a position of a peak in the intensity of said reflected light along a trajectory in said space-time volume, wherein the extension of said trajectory is determined using the method according to claim 1.

17. The method according to claim 16, wherein the step of determining said position of said peak in the intensity of said light emanated from said object is executed by estimating a light intensity distribution along said trajectory, wherein said peak is determined by estimating the centre of gravity of said light intensity distribution.

18. The method according to claim 16, wherein the method of determining said extension of said trajectory as well as the method of determining characteristics of said measure object are performed utilizing results from the same run of said measuring system.

19. The method according to claim 16, wherein said characteristics to be determined by the method comprises the three-dimensional contour of said measure object.

* * * * *